United States Patent [19]

Milovancevic

[11] 3,909,731

[45] Sept. 30, 1975

[54] COINCIDENCE TIMER

[76] Inventor: Slavko Milovancevic, P.O. Box 402, Torrance, Calif. 90508

[22] Filed: Oct. 23, 1973

[21] Appl. No.: 397,787

Related U.S. Application Data

[63] Continuation of Ser. No. 293,395, Sept. 29, 1972, abandoned.

[52] U.S. Cl. ................ 328/129; 307/232; 307/233; 307/283; 307/293; 328/110

[51] Int. Cl.² ..................... G01R 29/02; H03K 5/20

[58] Field of Search ........... 307/232, 233, 283, 293; 328/16, 17, 48, 49, 133, 129, 109–110, 71

[56] References Cited

UNITED STATES PATENTS 3,206,684 9/1965 Der et al. ............................ 307/233

3,414,739 12/1968 Paidosh ............................ 307/283

3,553,594 1/1971 Blasovszky ......................... 307/293

*Primary Examiner*—Stanley D. Miller, Jr.

[57] ABSTRACT

A coincidence timer and including a d-c voltage supply, two conventional oscillators of different frequencies (one being adjustable), a coincidence gate and a load connected between said coincidence gate and the d-c voltage supply, will produce short or long time delays by detecting time coincidence of the two (or more) frequencies.

7 Claims, 5 Drawing Figures

COINCIDENCE TIMER

BACKGROUND OF THE INVENTION

This is a continuation of divisional application of my application Ser. No. 293,395 filed Sept. 29, 1972, now abandoned.

FIELD OF INVENTION

The present invention relates to timing devices in general and to long time interval timing devices (e.g., on the order of hours and days) in particular.

DESCRIPTION OF THE PRIOR ART

Conventionally long time intervals are produced by using RC network combined with a voltage sensing device means like Unijunction Transistor and other. This technique works well for time intervals up to 5 and 10 minutes for wider ambient temperature range. In the General Electric's 'Transistor Manual,' 7th edition, pages 321 and 322, a 1 hour and 5 hour timers are presented. Drawback of these circuits is need for extremely large timing resistors (1,000 and 10,000 Megohms respectively.) If an adjustable timer is desirable, based on these circuits, situation is even worse. Increasing variable resistance over 5 and 10 Megohms is impractical since it puts stringent requirements on insulation resulting in a series of consequences in production, material cost and procurement, life span, accuracy and the usage of the device. Increasing capacitance over 1 Microfarad is also impractical since the insulation resistance between capacitor plates is temperature dependent - having negative temperature coefficient in general. An approximate relation between capacitance and insulation resistance is:

$$CR_{ins} = K_1 \quad (1)$$

where:

$C$ is the capacitance, $K_1$ is a constant $R_{ins}$ is the insulation resistance between capacitor plates.

Equation (1) tells us then, that for the same constant $K_1$ an increase in capacitance will dictate a decrease in resistance. Considering that $R_{ins}$ has a negative temperature coefficient becomes obvious that timing resistors must be decreased if the timer is to operate over wide ambient temperature range - resulting in shorter time delays. In addition, semiconductors are inherently temperature dependent which complicates their use over wide ambient temperature range.

There are no coincidence type timers known in the art, neither of short nor long time intervals, although coincidence principle is extensively used in practice as few listed U.S. patents will reveal it:

| | |
|---|---|
| H. Gisser et al, | Pat. No. 3,098,448 (Cl..102-70.2) |
| R. L. Miller et al, | Pat. No. 3,101,433 (Cl..317-149) |
| C. F. Der et al, | Pat. No. 3,206,684 (Cl..328-110) |
| J. Liska et al, | Pat. No. 3,250,923 (Cl..307-88.5) |
| F. J. Horlander, | Pat. No. 3,304,504 (Cl..328-72) |
| J. B. J. Aniano et al, | Pat. No. 3,346,742 (Cl..307-88.5) |
| C. F. Holmboe et al, | Pat. No. 3,518,556 (Cl..328-133) |
| C. F. Holmboe et al, | Pat. No. 3,526,841 (Cl..328-133) |
| M. Blasovszky, | Pat. No. 3,553,594 (Cl..328-129) |

Many features and details of the coincidence type timers will become apparent after examination of the present specification and the drawing (wherein like numbers designate like parts.)

DETAILED DESCRIPTION OF OPERATION

Figure 1:
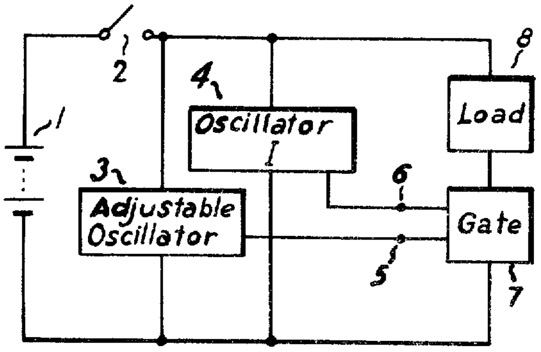
FIG. 1 is a block diagram of a basic coincidence timer
Figure 2:
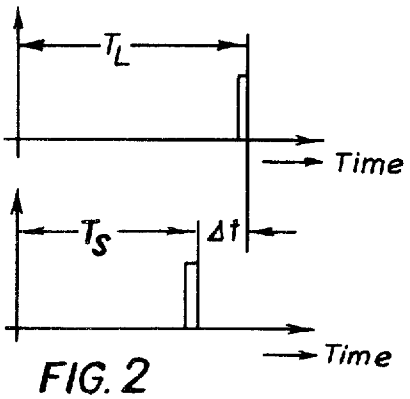
FIG. 2 represents time periods for oscillators of FIG.1

Referring to FIG. 1 coincidence timer of the present invention includes a d-c power source generally designated 1, a switch designated 2, first oscillator generally designated 4, second oscillator (adjustable in frequency) generally designated 3, output terminal of second oscillator designated 5, output terminal of first oscillator designated 6, a coincidence gate generally designated 7 and a load generally designated 8. The operation is as follows: After circuitry is energized oscillator named oscillator 1 (and designated 4) produces a train of pulses at a frequency $f_L$ having time period $T_L$. Oscillator named adjustable oscillator (and designated 3) produces a train of pulses at an adjustable frequency $f_S$ and respective time period $T_S$. Both periods of oscillation $T_L$ and $T_S$ are shown in FIG. 2 and their difference designated $\Delta t$ which obviously equals:

$$\Delta t = T_L - T_S \quad (2)$$

Referring again to FIG. 1 the end of the first pulse from adjustable oscillator will precede the end of the first pulse from oscillator 1 for time interval $\Delta t$ as expressed by Equation (2). Since pulses have not been applied to the gate 7 at the same time load 8 will not receive the power. After second interval $T_S$ oscillator 1 will deliver its second pulse after a delay of $2(\Delta t)$ — or in other words adjustable oscillator will lead oscillator 1 by a time $2(\Delta t)$. With each successive pulse adjustable oscillator will start its next time period for a $\Delta t$ sooner than oscillator 1. Thus, after a number of pulses $n$ expressed as:

$$n = \frac{T_S}{\Delta t} \quad (3)$$

where:

$n$ is the necessary number of pulses for coincidence to occur $T_S$ is the shorter period corresponding to adjustable oscillator $\Delta t$ is the difference of periods $T_L$ and $T_S$ a condition exists as expressed by the equation:

$$nT_L = (n+1)T_S \quad (4)$$

where:

$n$, $T_L$ and $T_S$ are same as before, when coincidence will occur, i.e., oscillator 1 and adjustable oscillator will produce their pulses at the same time, coincidence gate will apply power to load 8 after a time interval:

$$T_d = nT_L = (n+1)T_S = \frac{T_S^2}{\Delta t} \quad (5)$$

where:

$T_d$ . . . is the time interval (delay)

$n$, $T_L$, $T_S$ and $\Delta t$ are same as in equations (2), (3), and (4).

From Equation (5) is clear that the longer $T_S$, and the shorter $\Delta t$, the longer time interval $T_d$ will be. First experiment conducted with coincidence timer gave time intervals up to ¼ hour based on a $T_S$=0.2 sec.

Figure 3:
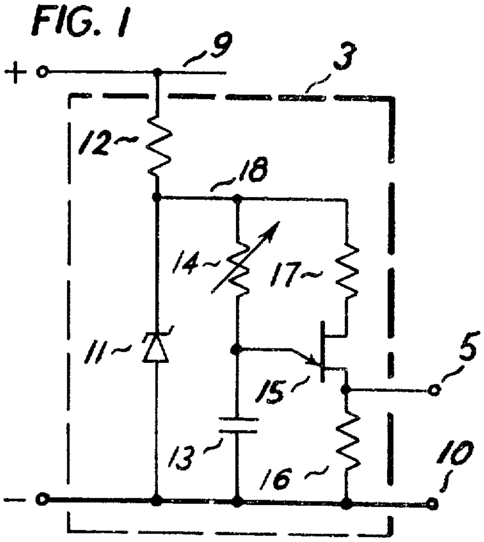
FIG. 3 is a conventional variable frequency oscillator as used in FIG.1

Referring now to FIG. 3 coincidence timer of the present invention, an example of the embodiment of adjustable oscillator includes Zener diode designated 11, resistor designated 12, capacitor designated 13, variable resistor designated 14, unijunction transistor designated 15, base 1 current limiting resistor 16, base 2 current limiting resistor 17, output terminal designated 5, common lead designated 10, positive lead designated 9, lead with the Zener regulated voltage designated 18, and the circuit as a block designated 3, as in FIG. 1. Such oscillator circuit is well known in the art and reported, for example, in the General Electric's 'Transistor Manual,' 7th edition, page 321 as part of FIG. 13.30. Explanation is therefore considered unnecessary. Stressed should be the double function of Zener diode 11: first as voltage regulator and, second to compensate for junction voltage changes (of unijunction transistor 15) due to change in ambient temperature. This is possible since the Zener diode junction has positive temperature coefficient, while unijunction transistor junction has negative temperature coefficient, a balance can be achieved by proper choice of Zener voltage and, by provision of a thermal coupling between the body of the Zener diode and the body of the unijunction transistor. This is easily achieved by mounting them on a common heatsink, i.e., a piece of metal with good conductivity for heat and assuring good thermal contact among them (using silicon grease) as known in the art.

The circuit of oscillator 4 is essentially the same as one for adjustable oscillator 3 with the only difference that variable resistor 14 of FIG. 3 will be nonvariable. For economy of the circuit Zener diode 11 and associated resistor 12 of FIG. 3 can be used also for oscillator designated 4 and used as oscillator 1.

Figure 4:
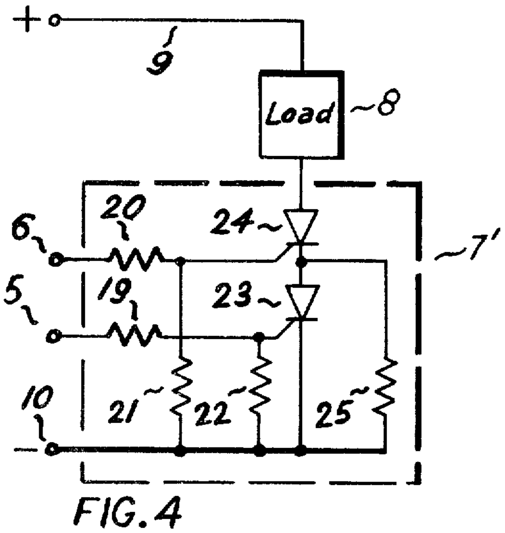
FIG. 4 is an example of coincidence gate used in FIG.1

Referring now to FIG. 4, coincidence timer of present invention shows an example of one type of embodiment of the gate designated 7 and load 8 of FIG. 1. In FIG. 4 however, the gate comprises a coincidence AND gate 7' connected to load 8. Such a coincidence AND gate (without resistor 25) is reported in General Electric's 'Transistor Manual,' 7th edition, page 428 in FIG. 16.44. Purpose of presence of resistor 25 will be explained later.

Circuit diagram of FIG. 4 includes a common lead designated 10, a a positive lead designated 9, load designated 8, first Silicon Controlled Rectifier (SCR) designated 24, second SCR designated 23, bleeder resistor designated 25 and connected in parallel to said SCR 23. Gate electrode of SCR 24 is connected to resistors designated 20 and 21, while gate electrode of SCR 23 is connected to resistors designated 19 and 22.

Bleeder resistor 25 is of a large value and used to bypass the leakage currents of SCR 24 across SCR 23, thus keep cathode of SCR 24 at approximately same potential as common lead 10. This allows easier and better defined triggering of SCR 24. Without resistor 25 potential at anode of SCR 23 and the cathode of SCR 24 would be approximately ½ the supply potential between leads 9 and 10.

Gate operates in the following manner. If a trigger pulse is applied to the gate of SCR 23 only, it can not trigger into conduction since SCR 24 is nonconductive and its leakage current is insufficient to keep SCR 23 in conductive state. Similarly, if a trigger pulse is applied to the gate of SCR 24 only it can not remain conductive since SCR 23 is nonconductive and resistor 25 allows only a small current through. However, if both SCR's are triggered at the same time and for sufficient time to reach the holding current value, SCR's will remain conductive supplying the load 8 with the power.

Figure 5:
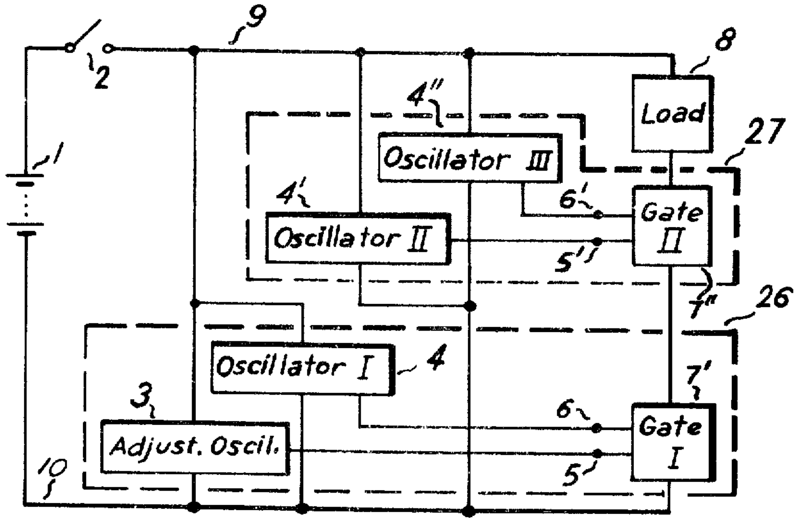
FIG. 5 is a block diagram of a coincidence timer for extremely long time intervals based on FIG.1.

Referring to FIG. 5 of the present invention includes a d-c power source generally designated 1, a power switch designated 2, a common lead designated 10 and a supply lead designated 9, oscillator 4, oscillator 4', oscillator 4'', and adjustable oscillator 3 - all oscillators being connected between leads 9 and 10 to receive the power for operation. Gate 7', gate 7'', and load 8 are connected in series between leads 9 and 10. Inputs to gate 7', designated 5 and 6 are connected to outputs of adjustable oscillator 3 and oscillator I respectively. In a similar manner inputs to gate 7'' designated 5' and 6' are connected to outputs of oscillators 4' and 4'' respectively.

Operation of FIG. 5 and its building blocks is essentially same as that of FIG. 1 with the only difference that the coincidence is now being detected between the two coincidence timers of FIG. 1 operating as pulse generating means, rather than the coincidence of two single oscillators as in FIG. 1. In other words, the 2 coincidence timers of FIG. 1 act as two oscillators - one having adjustable frequency, and designated 26 and 27. Time intervals of the arrangement of FIG. 5 are obviously much longer than those of FIG. 1.

Many more modifications, variations and details are possible - all based on heretofore described devices.

I claim:

1. A coincidence timer comprising:

means for generating a train of pulses at a first predetermined frequency, means for generating a train of pulses at a second predetermined frequency having a ratio to said first frequency ranging from 1 (one) to two (2), coincidence gating means for receiving the pulse outputs of said afore-mentioned means and generating a timing output signal whenever said afore-mentioned first and second pulses are in coincidence with each other, whereby said output signal, having period longer than the period of the said afore-mentioned first and second frequencies, is generated at intervals in accordance with the relative frequencies of the two pulse generating means and applied to a load.

2. The coincidence timer of claim 1 wherein the timing signal has a timing interval $nT_L$ defined by the Equation:

$$nT_L = (n+1)T_S \quad (4)$$

where:

$T_L$...is the longer period of said first predetermined frequency $T_S$...is the shorter period of said second predetermined frequency $n$....is the number of pulses $T_L$ needed for coincidence to occur.

3. The timer of claim 1 wherein the coincidence gating means comprises an AND gate.

4. The timer of claim 1 and further including means for adjusting the timing interval of said timing signal.

5. The timer of claim 1 wherein said pulse generating means comprises oscillators and adjusting means for adjusting the frequency of one of the said oscillators.

6. A coincidence timer comprising:

means for generating a train of pulses at a first predetermined frequency, means for generating a train of pulses at a second predetermined frequency, first coincidence gating means for receiving the pulse outputs of said afore-mentioned means and providing an electrical path therethrough whenever said afore-mentioned outputs are in coincidence with each other, means for generating a train of pulses at a third predetermined frequency, means for generating a train of pulses at a fourth predetermined frequency, second coincidence gating means for receiving the pulse outputs of said third and fourth frequencies and providing an electrical path therethrough whenever said last mentioned outputs are in coincidence with each other, this second gating means being connected in series with first gating means, a power source, load means connected to said first and second gating means, and the power source, said gating means being interposed between the power source and the load means whereby the output from said power source is applied to said load means only when said second gating means and said first gating means simultaneously provide electrical path therethrough.

7. The timer of claim 6 where the means for generating a train of pulses at a first predetermined frequency has said predetermined frequency adjustable thus providing adjustable time intervals.

* * * * *